United States Patent [19]

Twist

[11] 4,180,332
[45] Dec. 25, 1979

[54] DUST STOP

[75] Inventor: Ernest F. Twist, Leigh, England

[73] Assignee: USM Corporation, Farmington, Conn.

[21] Appl. No.: 941,228

[22] Filed: Sep. 11, 1978

[30] Foreign Application Priority Data

Sep. 9, 1977 [GB] United Kingdom ............... 37660/77

[51] Int. Cl.$^2$ ............................................. B01F 7/02
[52] U.S. Cl. ........................................ 366/279; 277/27; 277/93 R
[58] Field of Search ................ 366/279, 297, 318, 69, 366/70, 79, 83; 277/81, 89, 27, 93 R

[56] References Cited

U.S. PATENT DOCUMENTS

| B 519,623 | 4/1976 | Erich | 277/27 |
|---|---|---|---|
| 2,895,750 | 7/1959 | Gardner | 277/27 |
| 3,516,678 | 6/1970 | Stein | 277/27 |
| 3,563,516 | 2/1971 | White | 366/279 |
| 3,570,820 | 3/1971 | Macleod | 366/279 |
| 3,949,972 | 4/1976 | Bell | 277/81 R |

Primary Examiner—Robert W. Jenkins
Attorney, Agent, or Firm—Donald N. Halgren; Richard B. Megley; Vincent A. White

[57] ABSTRACT

A seal arrangement for the shaft of a high intensity mixer rotor comprises a block housing a plurality of pistons which together urge a collar axially of the shaft into engagement with a sealing surface of the rotor. The pistons are mounted in chambers in the block, and are all connected to a common pressurizable fluid inlet in the block. The block may be U-shaped to facilitate removal of the block from the shaft.

5 Claims, 2 Drawing Figures

DUST STOP

BACKGROUND OF THE INVENTION

1. Field of the Invention

This invention is concerned with improvements in or relating to mixing apparatus.

2. Prior Art

In order to mix powder or liquid materials, for example polymer powders or rubber components in powder form, it is known to introduce the material into a mixing chamber of a mixing apparatus and rotate one or more rotors which are within the chamber so that the material is mixed thereby. An apparatus of this kind is described, for example, in U.S. Pat. No. 4,053,144, issued Nov. 11, 1977, and is assigned to the assignee of the present invention. In such mixing apparatus, the rotors comprise shaft portions which extend beyond the mixing chamber through an aperture in a wall of the chamber for connection with motors used to rotate the rotors. It is necessary to seal the aperture, between the rotor and the wall of the mixing chamber, as otherwise the powder or liquid material could escape from the mixing chamber.

It is one of the various objects of the present invention to provide a mixing apparatus having improved sealing means for sealing between the wall of the mixing chamber and the rotor.

SUMMARY OF THE INVENTION

The present invention consists of a mixing machine which comprises a mixing chamber formed in a housing and two mixing rotors, each of which are mounted for rotation about an axis in the mixing chamber. Each rotor comprises two shaft portions which extend beyond the mixing chamber through apertures in walls of the chamber provided by end plates of the chamber. The mixing machine also comprises sealing means sealing the four apertures, between the end plates of the mixing chamber and the rotors. The sealing means comprises at each aperture, a collar through which the shaft portion extends and which is mounted for movement axially of the shaft portion. The collar extends through the aperture in the end plate of the mixing chamber to engage a generally axially facing annular sealing surface of the rotor. The sealing means also comprises an annular sealing member in the form of an O-ring sealing each aperture between a wall surface, provided by the end plate, surrounding the aperture and an outer surface of the collar.

Adjacent each of the apertures are pressing means operable to urge the collar axially of the shaft portion to maintain the collar in contact with the sealing surface of the rotor. The pressing means comprises a pressure block which has a plurality of (e.g. three) piston chambers formed therein extending in parallel directions generally axially of the rotor and all opening out of a common side of the block. The piston chambers each have a closed end within the block and an open end towards the collar.

The pressure block not more than partially surrounds the shaft portion of the rotor so that it can be removed from the rotor by movement radially of the rotor. The block may have a generally U-shaped recess therein in which the shaft portion of the rotor is received to facilitate removal thereof. The piston chambers of the block are uniformly distributed about the shaft portion, being spaced, for one embodiment, at angular intervals of 120° about the axis of rotation of the rotor and all located at the same radial distance from the axis. Pistons of the pressing means are mounted one in each of the piston chambers to project through the open end of the chamber and are arranged to urge the collar against the sealing surface of the rotor. The pressure block also has bores formed therein which provide conduits connecting the closed ends of the piston chambers to a single fluid inlet of the block. The inlet and the bores provide means whereby the piston chambers can be connected to a source of fluid under pressure. In the operation of the pressing means, pressure is applied behind the pistons, to urge the pistons outwardly of the chambers to cause the pistons to urge the collar against the sealing surface of the rotor, upon pressurization of the piston chambers.

BRIEF DESCRIPTION OF THE DRAWINGS

The objects and advantages of the invention will become more apparent from the following description, to be read with reference to the drawings in which.

DESCRIPTION OF THE PREFERRED EMBODIMENT

Figure 1:
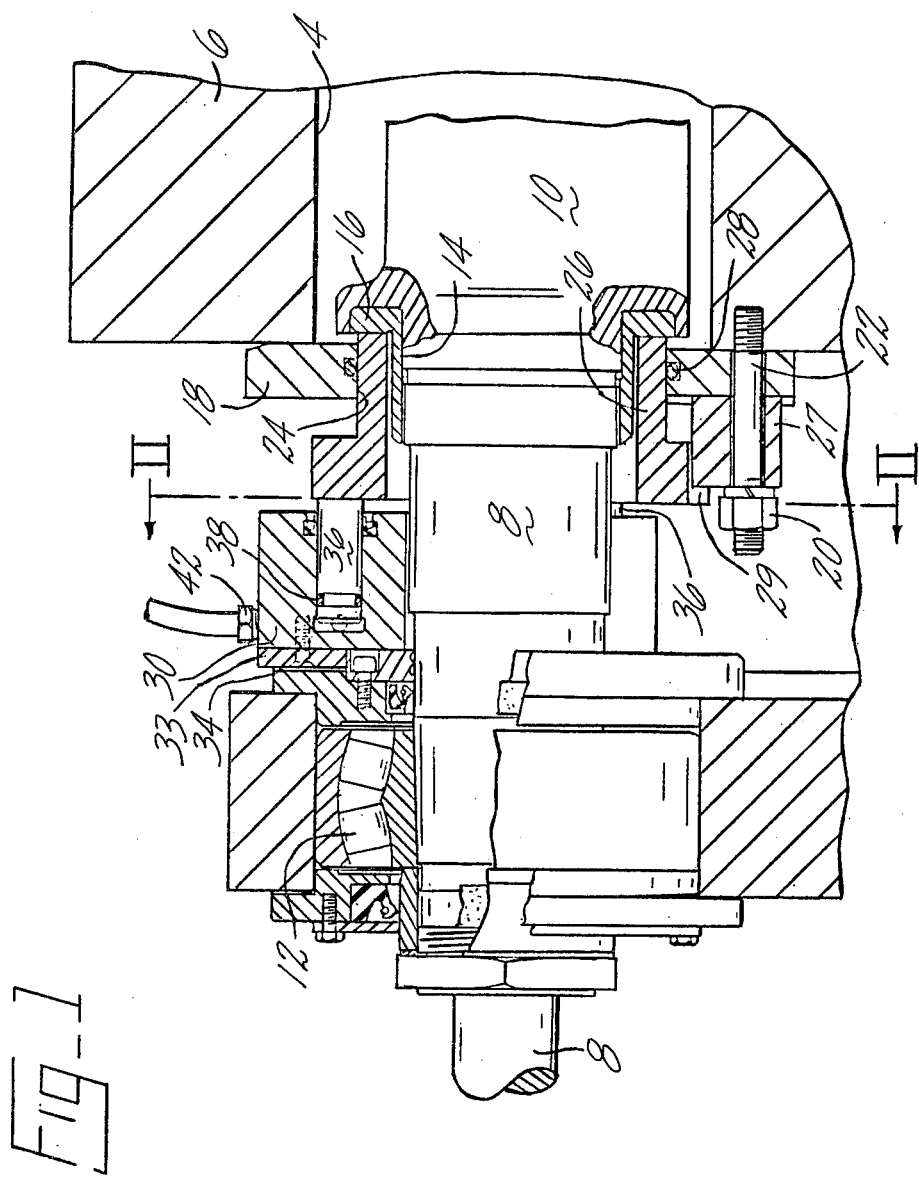
FIG. 1 is a sectional view in elevation of an upstream portion of a mixing machine constructed in accordance with the principles of the present invention.

Referring to the drawings in detail, and particularly to FIG. 1, there is shown a portion of a mixing machine utilizable for mixing polymers which are in powder, granular or fluid form. The machine comprises a mixing chamber 4 which extends longitudinally through a housing 6. The chamber 4 has two mixing rotors 10 extending longitudinally therethrough (only an upstream end portion of one is shown in the drawings where it passes out of the chamber 4) mounted for rotation about rotational axes. Since the upstream end portions of both of the rotors 10 are identical, only one end portion of one of these rotors 10 is hereinafter described.

Each of the rotors 10 comprises a shaft portion 8 at each end thereof, by which the rotor 10 is mounted for rotation. The rotor 10 also comprises a central mixing portion which is disposed within the mixing chamber 4. Each shaft 8 extends beyond the mixing chamber 4 and is supported for rotation in an arrangement of roller bearings 12. The central mixing portions of the rotors 10 are thus mounted for rotation in the chamber 4 to cause mixing of any material introduced into the mixing chamber 4.

The rotor 10 comprises a wear ring 14 secured to the exterior surface of the shaft 8 where it passes out of the mixing chamber 4. The ring 14 extends around the shaft 8 and has an external flange 16, formed thereon which is arranged within the chamber 4, and which also is received in a recess in an end surface of the central portion of the rotor 10. The ring 14 extends longitudinally of the shaft 8 from within the chamber 4 to a point outside the chamber 4. An annular end plate 18, providing a circular end wall of the mixing chamber 4, is secured to the housing 6 by means of a plurality of nuts 20 screwed onto an arrangement of studs 22 which project from the housing 6. The end plate 18 has two circular apertures 24 (only one shown), through which the shafts 8 and the ring 14 of each of the two rotors extend.

The present invention also comprises sealing means sealing between the wall of the mixing chamber 4, provided by the end plate 18, and the rotors 10. The sealing means associated with the shaft 8 shown in FIG. 1 forms a seal around the shaft portion 8 between a wall surface of the end plate 18 surrounding the aperture 24 and an annular sealing surface of the rotor 10 provided by the flange 16. The sealing means comprises a collar 26 which is axially movably mounted around the shaft 8 and which extends through the aperture 24. An annular sealing member in the form of an O-ring 28 or the like, may be located in an annular recess in the plate 18 to provide a seal between a mixing chamber wall surface (provided by the end plate 18) surrounding the aperture 24 and an outer surface of the collar 26. The annular right hand end face of the collar 26, as shown in FIG. 1, engages an axially facing sealing surface of the rotor presented by the flange 16 and makes a sealing engagement therewith. The collar 26 is slidable axially through the O-ring 28 so as to maintain sealing engagement with the flange 16. The collar 26 and the O-ring 28 thus seal the gap between the rotor 10 and the end plate 18. The collar 26 may be held against rotation by a key 27, mounted on one of the studs 22. The stud 22 extends into a slot 29 in the collar 26. The collar 26 may be formed from two halves, being split longitudinally of the shaft 8 to facilitate the removal of the collar 26 from the shaft 8. When the collar 26 is in use, the two halves sealingly engage one another.

Figure 2:
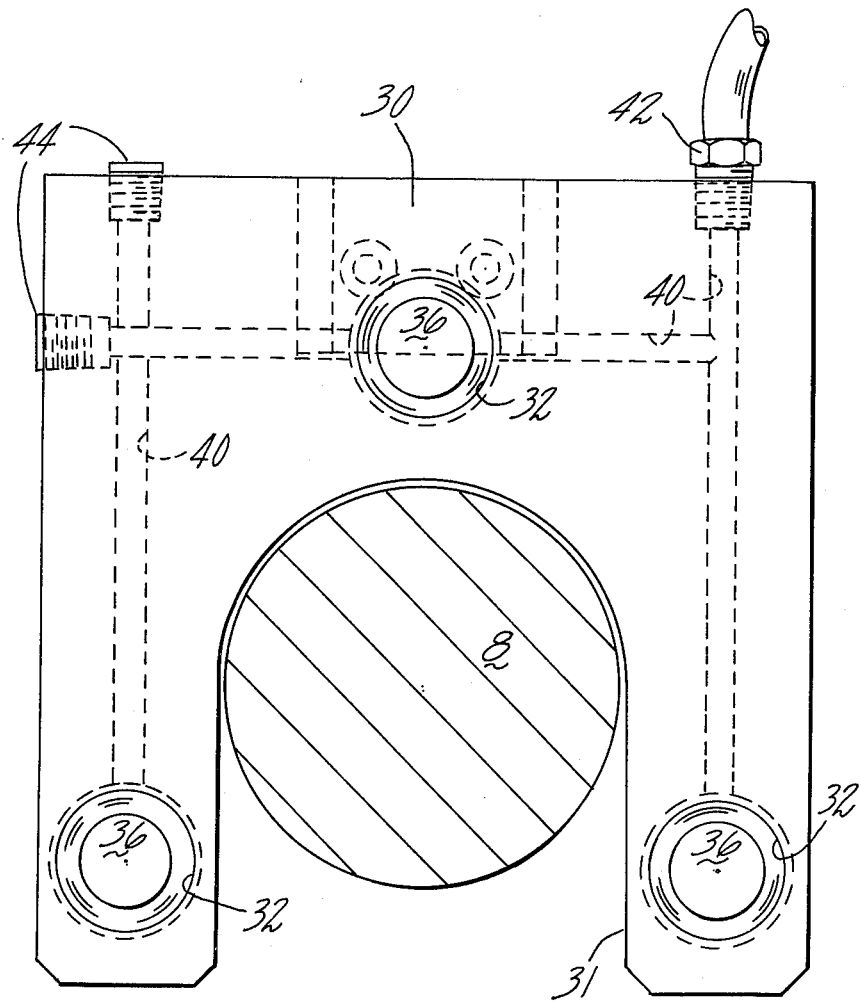
FIG. 2 is a sectional view, on a larger scale than FIG. 1, taken along the lines II—II of FIG. 1.

The sealing means also comprises pressing means operable to urge the collar 26 axially of the shaft 8 to maintain the collar 26 in contact with the sealing surface of the flange 16. The pressing means comprises a pressure block 30, as shown in FIGS. 1 and 2, which not more than partially surrounds the shaft 8 of the rotor 10, permitting it to be removed from the rotor by radial displacement therefrom. The block 30 may have a U-shaped recess 31 therein which receives the shaft 8. The block 30, has in the preferred embodiment, three cylindrical piston chambers 32 formed therein which extend parallel to one another and are arranged longitudinally of the shaft portion 8 in the directions generally parallel with the rotor 10. The chambers 32 open out of a common side of the block 30 facing the chamber 4. Each chamber 32 has a closed end within the block 30. As shown in FIG. 2, the chambers 32 are symmetrically distributed about the recess 31 at uniform angular intervals 120° for the preferred embodiment, about the axis of the shaft 8 and the axis of rotation of the rotor. The angular intervals would be smaller if there were more chambers arranged around the shaft 8. The block 30 is supported by means of a plate 33 screwed thereto which is slidable in a dovetailed slot 34 formed in the bearing housing of the roller bearings 12. The block 30 is mounted so that the shaft portion 8 passes through the recess 31, whereupon the chambers 32 are all located at the same distance from the axis of the shaft portion 8, and also so that the block 30 can be removed from the apparatus by being moved upwards (radially of the shaft portion) so that the plate 33 leaves the slot 34. The block 30 is thus easily removable for replacement or maintenance. Removal of the block 30 from the apparatus allows the collar 26 to be removed also, since it can be moved to the space left by the block 30 and its two halves thereupon removed.

Each of the piston chambers 32 has a piston 36 mounted therein which makes sealing engagement with a wall of its chamber 32 by means of an O-ring 38 or the like, and is slidable towards or away from the chamber 4. The pistons 36 are arranged, in the operation of the pressing means, to urge the collar 26 against the flange 16 by the pistons 36 being pushed by a pressurized fluid, the pistons 36 extending through the open ends of the chambers 32 and acting against the collar 26. The block 30 may also have conduits therein as exemplified by an arrangement of three bores 40 drilled therein as shown in FIG. 2. The conduits interconnect the closed ends of the chambers 32 with a single fluid inlet of the block. A connection 42, arranged at the fluid inlet, can be connected to a source of pressurizable air or hydraulic fluid (not shown) to supply the pressurized fluid for operation of the seal arrangement. The bores 40 intersect one another to make the interconnection to the connection 42. The open ends of two of the bores 40 may be each closed by a plug 44. The open end of the third of the bores 40 may have the connection 42 therein. The construction of the block 30 is such that the chambes 32 are interconnected without the necessity for external piping, which increases the ease of assembly of the illustrative apparatus and also ease of maintenance thereof. The pressure blocks 30 on the shaft portions at opposite ends of the same rotor 10 are preferably connected to a single source of fluid under pressure so that should the rotor 10 move axially during operation, fluid displaced owing to the rotor 10 displacing the pistons 36 of one block 30 inwardly of the block 30 is supplied to the chambers 32 of the other block, not shown, on the other end of the rotor 10, to cause a corresponding displacement outwardly of the pistons in that other block. The pistons 36 at the opposite ends of the rotor 10 are thus maintained in contact with the collars 26 by a self-compensating system.

In the operation of the present invention, the shafts 8 are caused to rotate by a motor (not shown) so that the rotors 10 rotate and mix material in the chamber 4. As the rotors 10 rotate, the pistons 36 act on the collars 26 to maintain a seal between the rotors 10 and the plates 18. If one of the rotors should move axially as it rotates, hydraulic fluid will be transferred to the other block away from which the rotor 10 is moved, so that the collars 26 are kept in sealing contact with the flanges 16.

What I claim is:

1. A mixing machine comprising:

a mixing chamber;

a mixing rotor mounted for rotation about an axis in said mixing chamber, said mixing rotor comprising a shaft which extends beyond said mixing chamber through an aperture in a wall of said chamber;

sealing means sealing between the wall of the mixing chamber and the rotor; said sealing means comprising a collar through which the shaft extends and which is mounted for movement axially of the shaft to engage a generally axially facing annular sealing surface of the rotor;

pressing means operable to urge the collar axially of the shaft to maintain the collar in contact with the sealing surface, the pressing means comprising a pressure block which has a plurality of piston chambers formed therein extending in directions generally axially of the rotor and spaced apart about the axis of rotation of the rotor, and a piston mounted in each of said piston chambers; and means whereby the piston chambers are fillable with a pressurizable fluid, the pistons being arranged to urge the collar against the sealing surface of the rotor upon pressurization of any fluid in said piston chambers;

said pressure block only partially surrounding said shaft of said rotor permitting easy removal thereof from said rotor by raidally directed movement from said rotor.

2. A mixing machine as recited in claim 1 in which said piston chambers are connected by an arrangement of conduits in said pressure block to a single fluid inlet of said block.

3. A mixing machine as recited in claim 1 in which said pressure block has an array of at least three piston chambers therein which are equally spaced at angular intervals about the axis of rotation of said rotor.

4. A mixing machine as recited in claim 1 in which said sealing means also comprises an annular sealing member sealing between a wall surface surrounding said aperture and an outer surface of said collar.

5. A mixing machine as recited in claim 4, wherein said pressure block has a recess therein into which a shaft of a rotor can be introduced by relative movement therebetween radially of said rotor, so that said shaft becomes partially surrounded by said pressure block, said pressure block having a plurality of piston chambers therein extending generally parallel to one another and opening out of a common side of said pressure block, there being a piston mounted in each of said chambers, said chambers being connected by an arrangement of conduits in said pressure block to a single fluid inlet of said pressure block to permit admission of fluid under pressure which would urge said pistons outwardly of their respective chambers.

* * * * *